US007214302B1

(12) United States Patent
Reihs et al.

(10) Patent No.: US 7,214,302 B1
(45) Date of Patent: May 8, 2007

(54) METHOD AND DEVICE FOR MOVING AND PLACING LIQUID DROPS IN A CONTROLLED MANNER

(75) Inventors: Karsten Reihs, Köln (DE); Burkhard Köhler, Leverkusen (DE); Dieter Rühle, Odenthal (DE)

(73) Assignee: Sunyx Surface Nanotechnologies GmbH, Cologne (DE)

( * ) Notice: Subject to any disclaimer, the term of this patent is extended or adjusted under 35 U.S.C. 154(b) by 321 days.

(21) Appl. No.: 10/089,933

(22) PCT Filed: Sep. 22, 2000

(86) PCT No.: PCT/EP00/09272

§ 371 (c)(1),
(2), (4) Date: Aug. 12, 2002

(87) PCT Pub. No.: WO01/24934

PCT Pub. Date: Apr. 12, 2001

(30) Foreign Application Priority Data

Oct. 5, 1999 (DE) ................................ 199 47 788

(51) Int. Cl.
*G01N 27/447* (2006.01)

(52) U.S. Cl. ...................... 204/643; 204/600; 204/450; 204/547

(58) Field of Classification Search ................ 204/547, 204/643, 450, 600; 428/411.1–704
See application file for complete search history.

(56) References Cited

U.S. PATENT DOCUMENTS

| | | | | |
|---|---|---|---|---|
| 4,525,425 A * | 6/1985 | Church | 428/428 |
| 5,674,592 A | 10/1997 | Clark et al. | 428/161 |
| 5,693,236 A * | 12/1997 | Okumura et al. | 216/7 |
| 5,928,880 A * | 7/1999 | Wilding et al. | 435/7.21 |
| 6,042,948 A * | 3/2000 | Ogawa et al. | 428/447 |
| 6,294,063 B1 * | 9/2001 | Becker et al. | 204/450 |
| 6,296,793 B1 * | 10/2001 | Anthes et al. | 264/104 |

FOREIGN PATENT DOCUMENTS

| | | |
|---|---|---|
| DE | 19847421 A1 | 4/2000 |
| DE | 19860135 A1 | 6/2000 |
| DE | 19860136 A1 | 6/2000 |
| DE | 19860139 C1 | 7/2000 |
| WO | WO 96/04123 | 2/1996 |
| WO | WO 96/21523 | 7/1996 |
| WO | WO 96/34697 | 11/1996 |

(Continued)

OTHER PUBLICATIONS

Washizu, M., "Electrostatic Actuation of Liquid Droplets for Microreactor Applications." IEEE Trans. Ind. Appl., 34, 4, 732-737. (1998).*

(Continued)

*Primary Examiner*—Nam Nguyen
*Assistant Examiner*—Jeffrey Barton
(74) *Attorney, Agent, or Firm*—Perman & Green, LLC

(57) ABSTRACT

The invention relates to a method and a device which serves for moving and dosing amounts of liquid on a microscopic scale with a volume of especially $10^{-12}$ to $10^{-6}$ liters by means of an inhomogeneous electric field using a support having an ultraphobic surface.

8 Claims, 4 Drawing Sheets

FOREIGN PATENT DOCUMENTS

Figure 1:
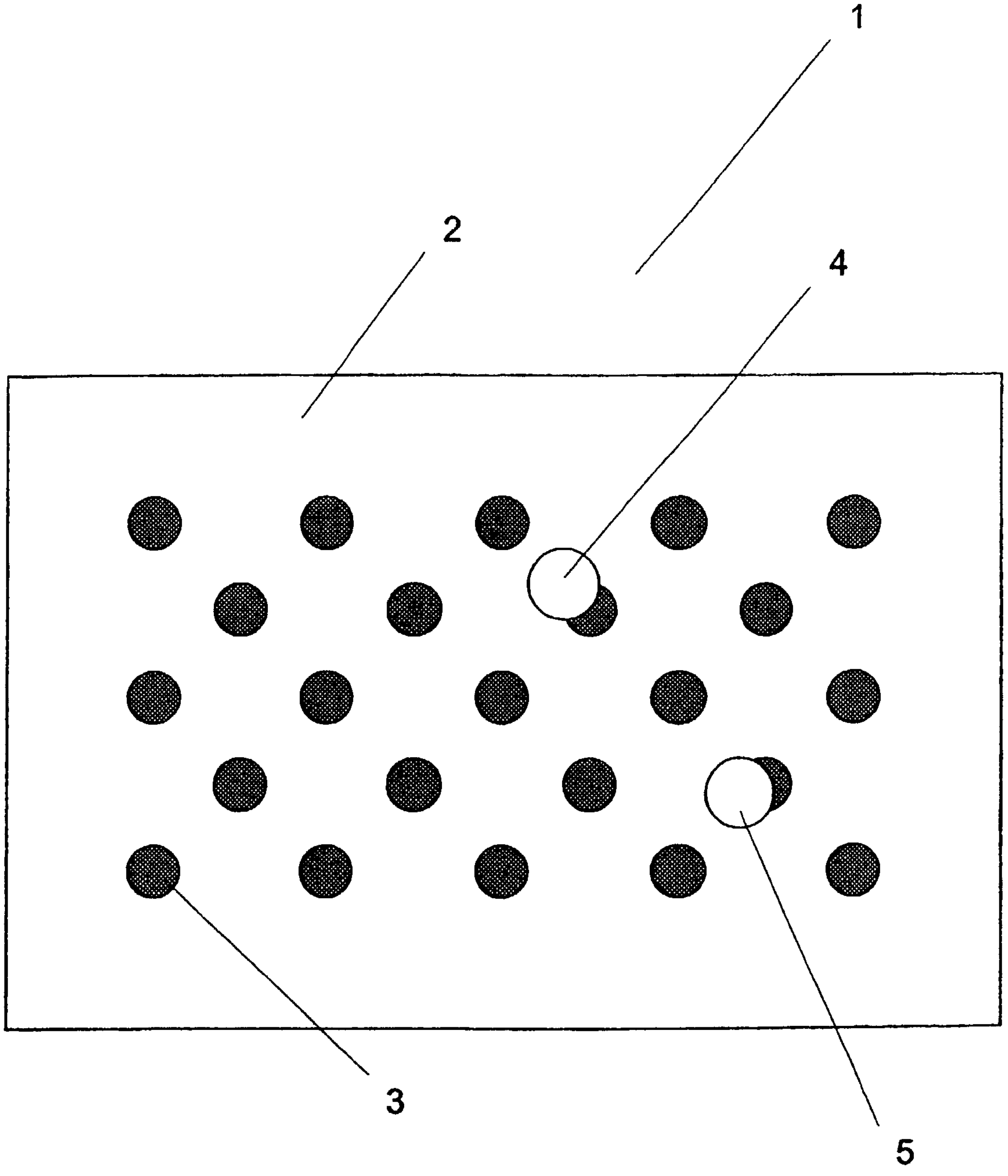

| | | |
|---|---|---|
| WO | WO 98/23549 | 6/1998 |
| WO | WO 99/54730 | 10/1999 |
| WO | WO 00/38845 | 7/2000 |
| WO | WO 00/39051 | 7/2000 |
| WO | WO 00/39239 | 7/2000 |
| WO | WO 00/39240 | 7/2000 |
| WO | WO 00/39368 | 7/2000 |
| WO | WO 00/39369 | 7/2000 |

OTHER PUBLICATIONS

Onda, T. et al., "Super-Water-Repellent Fractal Structures." Langmuir. 12, 9, 2125-2127. (1996).*

"Surfactants Europe, A Dictionary of Surface-Active Agents Available In Europe", Royal Society of Chemistry, 1995.

* cited by examiner

METHOD AND DEVICE FOR MOVING AND PLACING LIQUID DROPS IN A CONTROLLED MANNER

This application is the National Stage entry under 35 §371 of International Application No. PCT/EP00/09272, International Filing Date, 22 Sep. 2000, which designated the United States of America, and which international application was published under PCT Article 21(2) in German as WO 01/24934, and claims benefit of foreign priority to German Application DE 199 47 788.4, filed 5 Oct. 1999.

The present invention relates to a method and a device for moving and dosing amounts of liquid on a microscopic scale with a volume of especially $10^{-12}$ to $10^{-6}$ liters by means of an electric field using a support with an ultraphobic surface, optionally in association with an ultraphobic dosing tip.

Manipulating and, in particular, dosing of extremely small drops of liquid having a volume in the order of $10^{-12}$–$10^{-6}$ liters or a diameter in the order of about 0.01–1 mm represents a problem even today, because even an extremely small loss of liquid during this process, also referred to as microdosing, will give rise to substantial deviations from the desired dosage quantity. Such loss of liquid arises if e.g. the drop of liquid is shifted along a conventional surface, because part of the liquid drop will adhere to the surface even in the event of a highly smooth surface.

The object is therefore to provide a method of moving and dosing liquid drops having a volume of especially less than $10^{-6}$ liters without significant loss of liquid.

According to the invention, said object is accomplished by providing a method of microdosing liquid drops, wherein the liquid drops are moved free of loss by means of an inhomogeneous electric field on a support having an ultraphobic surface.

The invention is directed to a method of moving or dosing liquid drops on a microscopic scale, which method is characterized in that the liquid drops are moved on a support having an ultraphobic surface, using an inhomogeneous electric field, preferably an inhomogeneous field between said support and a manipulator.

Preferably, an electrically charged tip or wire, particularly a tip or wire having an ultraphobic surface is used as manipulator.

In a preferred embodiment, a voltage of from 100 to 1000 volts, preferably from 400 to 600 volts, is applied between manipulator and support in order to generate the electric field. Depending on the geometry of the array, the voltage may vary within a wide range.

The invention is also directed to a device for the microdosage of liquid drops, which device has at least one support having an ultraphobic surface, optionally at least one liquid reservoir, an electrically chargeable manipulator, and a means for generating an inhomogeneous electric field. Optionally, said manipulator can also be an ultraphobic tip/wire or the like.

A liquid drop in the meaning of the invention may consist of any liquid and preferably has a volume of from $10^{-12}$ to $10^{-6}$ liters, more preferably from $10^{-9}$ to $10^{-6}$ liters. According to the invention, such a drop is shifted without loss on an ultraphobic surface, using a shiftable electric field.

It is also preferred to separate a liquid drop from a liquid reservoir by means of the electric field. Using the electric field, it is possible to combine and thereby mix a plurality of liquid drops on an ultraphobic surface. All of these process steps can also be performed in any combination of each other.

In a preferred embodiment, the electric field is present between a tip, which tip preferably has a diameter of from 0.01 to 1 mm, any desired length and an ultraphobic surface, and a preferably metallic support. Using said tip, liquid drops are shifted on the ultraphobic surface. The tip has an ultraphobic surface, which is why there is no adhering of liquid particles to the tip.

The liquid drops assume a nearly spherical shape both at the tip and on the ultraphobic surface and therefore, the volumes thereof can be calculated easily from the diameter determined e.g. under a microscope.

In another preferred embodiment, the liquid reservoir of the device has an electrostatic charging means.

Ultraphobic surfaces in the meaning of the invention involve the feature that the contact angle of a water drop resting on the surface is more than 150° and the roll-off angle is not more than 10°.

The roll-off angle is understood to be the angle of inclination of a basically planar, yet structured surface relative to the horizontal line, at which angle a resting drop of water 10 µl in volume is moved due to gravity when tilting the surface.

For example, such ultraphobic surfaces have been disclosed in the laid-open documents WO 98/23549, WO 96/04123, WO 96/21523, and WO 96/34697, which hereby are incorporated by reference and thus deemed to be part of the disclosure.

In a preferred embodiment, the ultraphobic surface has a surface topography where the spatial frequency f of the individual Fourier components and their amplitudes a(f) expressed by the integral of the function $S(\log f)=a(f)\times f$ calculated between the integration limits $\log(f_1/\mu m^{-1})=-3$ and $\log(f_1/\mu m^{-1})=3$ is at least 0.5 and consists of a hydrophobic or, in particular, oleophobic material, or of a durably hydrophobized or, in particular, durably oleophobized material. Such an ultraphobic surface has been described in the International Patent Publication No. WO 00/39240.

In the meaning of the invention, a hydrophobic material is a material which exhibits a contact angle, related to water, of more than 90° on a planar, non-structured surface.

In the meaning of the invention, an oleophobic material is a material which exhibits a contact angle, related to long-chain n-alkanes such as n-decane, of more than 90° on a planar, non-structured surface.

The ultraphobic surface preferably is an aluminum surface which is provided with microstructures, anodized, optionally sealed, calcined, optionally coated with an adhesion-promoting layer, and subsequently provided with a hydrophobic and/or oleophobic coating as described in the International Patent Publication No. WO 00/39369.

The manipulator and/or support can be made entirely of aluminum or preferably has an aluminum coating, the aluminum being treated as stated above.

It is also preferred that the ultraphobic surface be an aluminum surface which optionally is anodically oxidized, sealed with hot water or steam, optionally coated with an adhesion-promoting layer, and subsequently provided with a hydrophobic and/or oleophobic coating as described in the International Patent Publication No. WO 00/39368. The dosing tip can be made entirely of aluminum or preferably has an aluminum coating, the aluminum being treated as stated above.

Furthermore, the ultraphobic surface preferably is a surface which is coated with $Ni(OH)_2$ particles, optionally coated with an adhesion promoter, and subsequently provided with a hydrophobic and/or oleophobic coating as described in the International Patent Publication No. WO 00/39239. The $Ni(OH)_2$ particles preferably have a diameter $d_{50}$ of from 0.5 to 20 μm.

In another advantageous embodiment, the ultraphobic surface is made of tungsten carbide which is structured with a laser, optionally coated with an adhesion promoter, and subsequently provided with a hydrophobic and/or oleophobic coating as described in the International Patent Publication No. WO 00/39051. Preferably, the dosing tip is coated with tungsten carbide only, which then is treated as stated above. The tungsten carbide preferably has a layer thickness of from 10 to 500 μm.

Furthermore, the surface preferably is sandblasted using a blasting means, optionally coated with an adhesion-promoting layer, and subsequently provided with a hydrophobic and/or oleophobic coating as described in the International Patent Publication No. WO 00/38845.

Any surface-active phobizing aid of any molar mass is suitable as hydrophobic and/or oleophobic coating of the above-mentioned surfaces. These compounds are cationic, anionic, amphoteric and/or non-ionic surface-active compounds as listed in the index "Surfactants Europe, A Dictionary of Surface-Active Agents Available in Europe, Edited by Gordon L. Hollis, Royal Society of Chemistry, Cambridge, 1995.

For example, the following may be mentioned as anionic phobizing aids: alkyl sulfates, ether sulfates, ether carboxylates, phosphate esters, sulfosuccinates, sulfosuccinate amides, paraffin sulfonates, olefin sulfonates, sarcosinates, isothionates, taurates, and lignin compounds.

For example, quaternary alkylammonium compounds and imidazoles may be mentioned as cationic phobizing aids.

Amphoteric phobizing aids are betaines, glycinates, propionates, and imidazoles, for example.

Non-ionic phobizing aids are e.g. alkoxylates, alkylamides, esters, amine oxides, and alkylpolyglycosides. Furthermore, reaction products of alkylene oxides with alkylatable compounds such as fatty alcohols, fatty amines, fatty acids, phenols, alkylphenols, arylalkylphenols such as styrene-phenol condensation products, carboxylic acid amides, and rosin acids are possible.

Those phobizing aids are particularly preferred wherein from 1 to 100%, more preferably from 60 to 95% of the hydrogen atoms are substituted by fluorine atoms. Perfluorinated alkyl sulfates, perfluorinated alkyl sulfonates, perfluorinated alkyl phosphonates, perfluorinated alkyl phosphinates, and perfluorinated carboxylic acids may be mentioned as examples.

Preferably, compounds having a molar mass m.w.>500–1,000,000, preferably 1,000–500,000, and more preferably 1,500–20,000 are employed as polymeric phobizing aids in hydrophobic coating, or as polymeric hydrophobic material for the surface. These polymer phobizing aids can be nonionic, anionic, cationic, or amphoteric compounds. Furthermore, these polymer phobizing aids can be homo- and copolymers, graft polymers and graft copolymers, as well as random block polymers.

Particularly preferred polymer phobizing aids are AB, BAB and ABC type block polymers. In AB or BAB block polymers, the A segment is a hydrophilic homopolymer or copolymer, and the B block is a hydrophobic homopolymer or copolymer or a salt thereof.

Also, anionic polymeric phobizing aids, especially condensation products of aromatic sulfonic acids with formaldehyde and alkylnaphthalenesulfonic acids, or of formaldehyde, naphthalenesulfonic acids and/or benzenesulfonic acids, and condensation products of optionally substituted phenol with formaldehyde and sodium bisulfite are particularly preferred.

Also preferred are those condensation products which can be obtained by reaction of naphthols with alkanols, addition of alkylene oxide and at least partial conversion of the terminal hydroxy groups to sulfo groups or semi-esters of maleic acid and phthalic acid or succinic acid.

In another preferred embodiment, the phobizing aid is from the group of sulfo-succinic esters and alkylbenzenesulfonates. Sulfated, alkoxylated fatty acids or salts thereof are also preferred. Alkoxylated fatty alcohols are understood to be $C_6$–$C_{22}$ fatty alcohols, saturated or unsaturated, particularly stearyl alcohol, provided with 5 to 120, 6 to 60, and in a particularly preferred fashion, with 7 to 30 ethylene oxide units. The sulfated alkoxylated fatty alcohols preferably are present as salts, particularly as alkali or amine salts, preferably as diethylamine salt.

Preferred fields of use for the method and device according to the invention are biochemical or chemical methods wherein microscopic volumes of liquid have to be moved, mixed or dosed. The following may be mentioned as examples: the PCR (polymerase chain reaction), ELISA (enzyme-linked immunosorbent assay), or the determination of enzyme activity.

The method according to the invention is easier to perform compared to conventional microdosing using pressure. As a result of the minimal adhesion of liquid drops to the ultraphobic surfaces, manipulation of extremely small drops of liquid is possible without loss, thereby avoiding dosage errors.

The invention is also directed to the use of the device of the invention in the dosage of liquids on a microscopic scale, especially in a range of from $10^{-6}$ to $10^{-12}$ liters.

With reference to the FIGS. 1 to 4, the device according to the invention will be exemplified in more detail below.

FIG. 1 shows a plastic plate 2 for shifting liquid drops 4, 5 using a plurality of electrodes 3.

Figure 2:
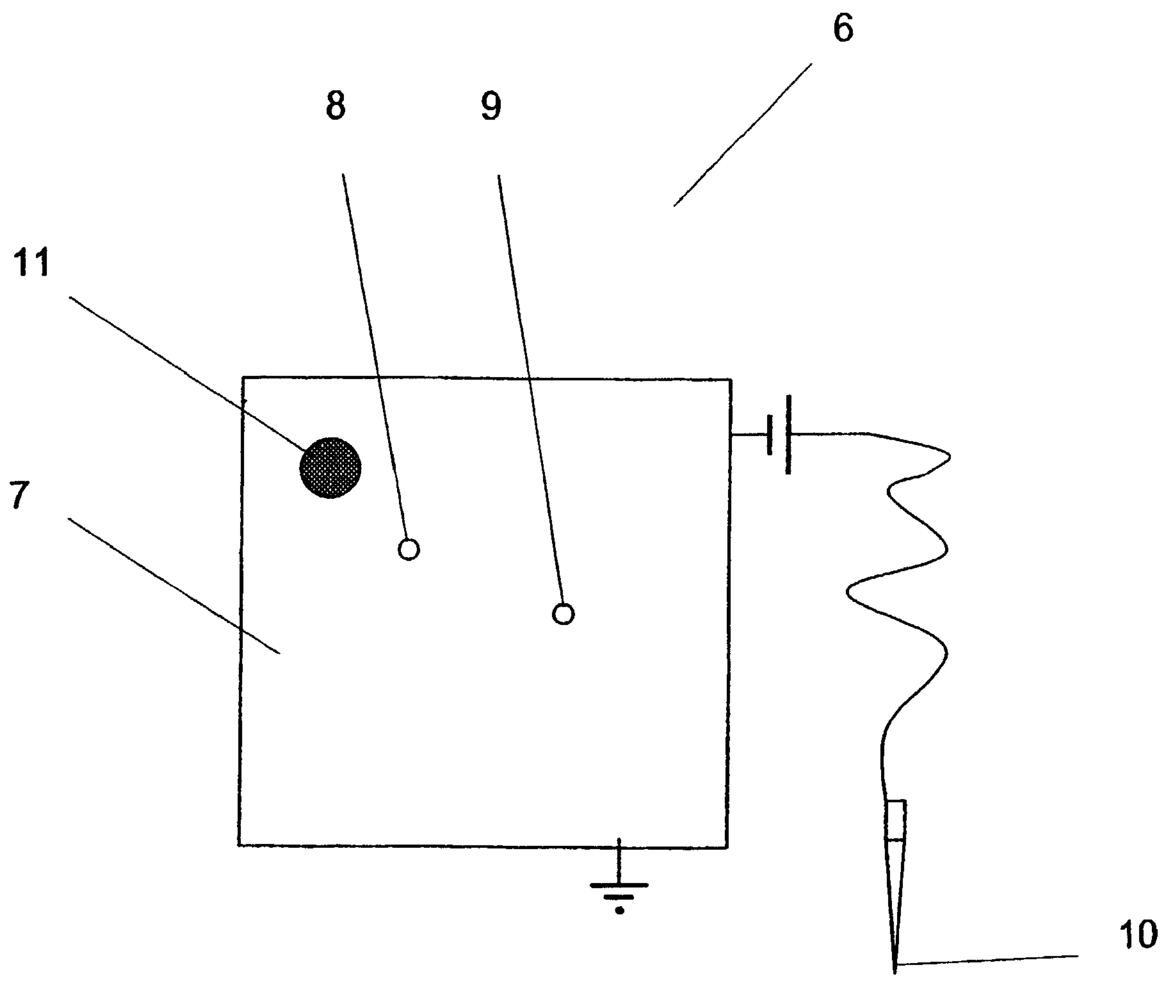

FIG. 2 shows as an aluminum plate 7 having an electrically charged tip 10 as manipulator.

Figure 3:
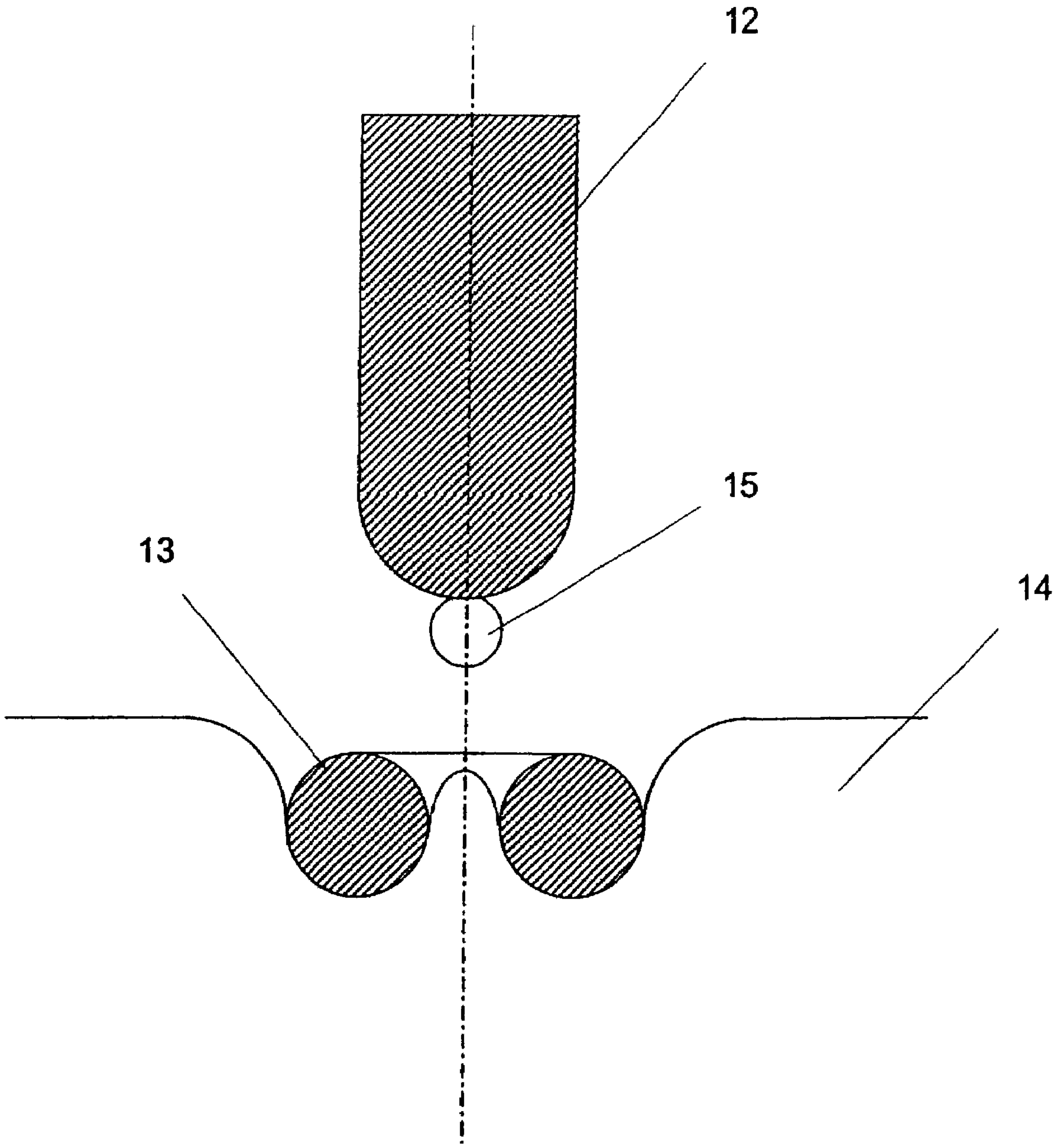

FIG. 3 shows a round tip 12 with an annular electrode 13 for discharging small volumes of liquid 15 from a reservoir 14 (cross-sectional drawing).

Figure 4:
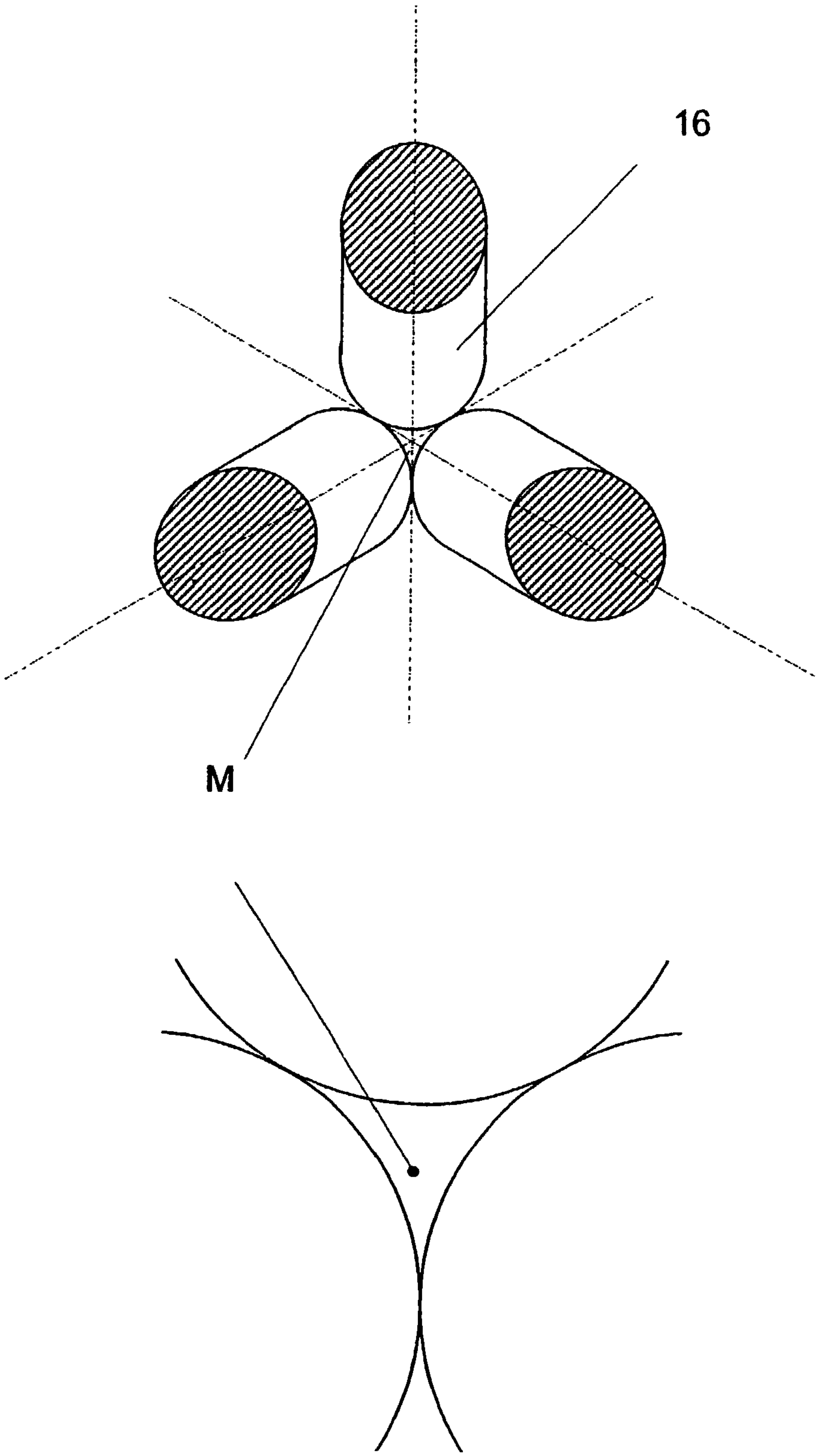

FIG. 4 shows an array of three tips 16 forming a nearly triangular gap M which can be used instead of annular electrode 13 in FIG. 3 to discharge small amounts of liquid from a reservoir.

EXAMPLES

Example 1

FIG. 1 shows a device 1 of the invention for shifting liquid drops (in this event: aqueous solutions) on solid surfaces without leaving a residue.

The device consists of a substrate 2 (in this event: plexiglass), the surface of which is provided with round, electrically conductive electrodes 3 (diameter 1 mm, spacing 5 mm) aligned with the surface of the substrate. Varying voltages can be applied at the individual electrodes 3.

The surface of substrate 2 is provided with an electrically insulating ultraphobic coating about 5 μm in thickness. To this end, a layer of aluminum about 5 μm in thickness is vapor-deposited on the substrate. The Al layer is subjected to anodic oxidation, treated with hot steam, and provided with a hydrophobic coating. To produce the hydrophobic coating, the substrate is immersed in a 1 wt.-% solution of Fluowet PL80 from Clariant Company for 5 hours at pH 7, rinsed with water, and dried at 60° C.

Producing the Ultrahydrophobic coating:

a. Metallizing:

An aluminum layer about 5 μm in thickness is thermally vapor-deposited on the substrate. The surface is subsequently degreased for 3 minutes in distilled chloroform ($CHCl_3$).

b. Anodic Oxidation:

Anodic oxidation of the aluminum surface is performed in 1N sulfuric acid with continuous electrolyte agitation under laminar flow conditions. The electrolyte temperature of 20° C. is controlled by a thermostat. The spacing between the substrate material and the counterelectrode made of $AlMg_3$, semi-rigid, is 5 cm. The current density during the anodic oxidation is controlled to be a constant 10 mA/$cm^2$. The oxidation is continued until an oxide layer about 2–3 μm in thickness is formed.

c. Treatment with Water:

Following anodic oxidation, the sample is rinsed in distilled water for 5 minutes and subsequently in methanol for 1 minute. Following drying (air, room temperature), the sample is treated in distilled water at 100° C. for 15 minutes in a beaker which previously has been boiled with distilled water several times. This treatment is followed by rinsing in methanol (1 min) and drying at 80° C. in a drying oven for 1 hour.

As a result of this treatment, the Al layer is converted completely to an aluminum oxide layer.

Handling of the Device:

Initially, all of the electrodes 3 are supplied with the same electric potential. A drop 5 can be shifted towards a directly adjacent electrode by switching this electrode to a potential of 800 V versus the other electrodes. Thereafter, the drop comes to rest above the respective electrode.

By repeated switching of the electrodes 3, the movement of the drop 5 on the surface can be controlled at will within the electrode screen. In this way, different drops 4, 5 can be shifted to the same position and made to combine.

The movement of the drops 4, 5 on the ultraphobic surface proceeds without leaving a residue, i.e., without adherence of liquid residues along the path of movement. This can be established as follows: A drop 4 (about 1 mm in diameter) of a solution of 4-(6-diethylamino-3-diethylimino-3H-xanth-9-yl)-1,3-benzene-disulfonic acid (Kiton Red, concentration: $1\times10^{-2}$ mol/l in water) rests on the ultraphobic surface. The drop 4 is shifted along a closed path via 8 electrodes (length of path: 40 mm). This process is repeated 10 times, so that the overall path is 400 mm. Subsequently, the drop is removed, and a drop of pure water is likewise shifted 10 times along the closed path previously used.

This water drop is subjected to a spectrophotometric investigation. No dye can be detected down to the detection limit of $10^{-10}$ mol/l (based on drop volume). Hence, losses as a result of shifting the drop are less than 10 ppb.

Correspondingly, the example illustrated above can also be used for liquid drops surrounded by solid walls on all sides, e.g. in gaps or tubes. Consequently, these embodiments permit conveyance of liquids without loss merely by varying electric fields, i.e., without mechanically moving parts.

Example 2

FIG. 2 shows a device 6 of the invention for complete transfer of liquid drops (in this event: aqueous solutions) using a movable tip 10.

The device has a support plate 7 of aluminum with an ultraphobic coating and a tip 10. The tip also has an ultraphobic surface. The ultraphobic coating is produced in accordance with Example 1.

Handling of the Device:

A drop 8 of a solution of 4-(6-diethylamino-3-diethylimino-3H-xanth-9-yl)-1,3-benzenedisulfonic acid (Kiton Red, concentration: $1\times10^{-2}$ mol/l in water) rests on the ultraphobic surface. The volume $V=(3.00\pm0.05)\times10^{-9}$ liters. The volume has been determined via the diameter of the spherical drop, using a measuring microscope.

The drop 8 can be picked up by means of tip 10. To this end, the tip is approached to a distance of about 5 mm, a voltage of 800 V being applied between tip 10 and substrate plate 7. The radius of the tip is about 0.5 mm. By switching off the voltage, the drop adhering to the tip is transferred into a vessel including 65 μl of water.

Using spectrophotometry, the dye concentration in the water is subsequently determined to be $4.54\times10^{-7}$ mol/l, corresponding to a volume V=2.95 nl transferred by the tip. The transfer is conducted 5 times in the same way, with no loss of transferred volume resulting within the relative dosing error of 1.5%.

Example 3

A further example illustrates dosing and complete transfer of liquid drops, using the device of FIG. 2.

A drop 8 of a solution of 4-(6-diethylamino-3-diethylimino-3H-xanth-9-yl)-1,3-benzenedisulfonic acid (Kiton Red, concentration: $1\times10^{-2}$ mol/l in water) rests on the ultraphobic surface. The volume $V_3=(3.00\pm0.05)\times10^{-9}$ liters.

Another drop 9 of a solution of 1,1'-diethyl-4,4'-dicarbocyanine iodide (concentration: $1\times10^{-2}$ mol/l in water) rests on the ultraphobic surface. The volume $V^4=(3.00\pm0.05)\times10^{-9}$ liters.

Using the tip 10, the drop 8 is picked up as in Example 2. By switching off the voltage, the drop adhering to the tip is deposited in a well 11 of the device. The other drop 9 is picked up with the tip and combined with drop 8 in the well. Subsequently, both drops are picked up with the tip and transferred in accordance with Example 2 into a vessel including 65 μl of water.

The concentrations of the dyes in the water are subsequently determined using spectrophotometry. The transfer is conducted 5 times in the same way, with no loss of the transferred volumes $V_3$ and $V_4$ resulting within the relative dosing error of 1.5%.

Example 4

FIG. 3 shows an arrangement for discharging small defined volumes of liquid from a reservoir (cross-sectional drawing). The arrangement consists of an electrode 12 with a round tip (1 mm in diameter) and an annular electrode 13 (inner diameter: 0.5 mm). Both electrodes are provided with an ultrahydrophobic coating, the production of which has been described in Example 1. The arrangement is immersed in an aqueous solution of 4-(6-diethylamino-3-diethylimino-3H-xanth-9-yl)-1,3-benzenedisulfonic acid (Kiton Red, concentration: $1\times10^{-2}$ mol/l in water) as shown in FIG. 3. When applying a voltage of 900 V between the annulus 13 and the electrode 12, a liquid drop 15 is discharged from the reservoir 14 and remains adhered to the electrode 12. The drop can be transferred to another vessel by lateral tilting and switching off the electric field. The volume of drop 15 is determined by measuring the fluorescence intensity of the dye in a known volume of water. After 30 discharge repetitions, a volume of $(65.0\pm0.2)\times10^{-9}$ liters is obtained.

Example 5

An arrangement as in FIG. 4 can be used instead of the annular electrode 13 of the device in FIG. 3. Therein, three round electrodes 16 (1 mm in diameter) are provided with an ultrahydrophobic coating, the production of which has been described in Example 1. As described in FIG. 4, the electrodes 16 are arranged to form a nearly triangular gap M which assumes the same function as the annular electrode 13 in FIG. 3. Using this arrangement, a liquid drop is discharged from a reservoir as in Example 1. With 30 discharge repetitions, a volume of $(50.0\pm0.3)\times10^{-12}$ liters is obtained.

Similarly, other structures (round, square gaps or gaps of any shape in cross-sectional or top view) can be used for dosing instead of the annulus 13 in FIG. 3. Structures which can be generated using familiar microstructuring techniques (e.g. light, X-ray or electron lithographic techniques) are particularly suited to this end, because small volumes to be dosed require correspondingly small structures.

What is claimed is:

1. A substrate in which several electrodes are placed on which varying voltages can be applied individually and said substrate being provided with an ultraphobic coating, wherein the coating is electrically insulating and the contact angle of a water drop resting on the coating is more than 150° and the roll-off angle of a drop of water 10 µl in volume due to gravity is not more than 10° and movement of a drop of water on the coating takes place without residues, and wherein the ultraphobic coating is an aluminum surface treated with steam and coated with a hydrophobic and/or oleophobic material.

2. The substrate according to claim 1, wherein the electrodes are substantially aligned with the surface of the substrate.

3. The substrate according to claim 2, wherein the electrodes are aligned in an array.

4. The substrates according to claim 1, wherein the ultraphobic surface has a surface topography where the spatial frequency f of the individual Fourier components and their amplitudes a(f) expressed by the integral of the function $S(\log(f))=a(f)\times F$ calculated between the integration limits $\log(f_1/\mu m^{-1})=-3$ and $\log(f_1/\mu m^{-1})=3$ is at least 0.5 and consists of ultraphobic polymers or durably ultraphobic materials.

5. A substrate in which several electrodes are placed on which varying voltages can be applied individually and said substrate being provided with an ultraphobic coating, wherein the coating is electrically insulating and the contact angle of a water drop resting on the coating is more than 150° and the roll-off angle of a drop of water 10 µl in volume due to gravity is not more than 100 and a movement of a drop of water on the coating takes place without residues, wherein the ultraphobic coating is a surface which is coated with $Ni(OH)_2$ particles and covered with a hydrophobic and/or oleophobic material.

6. The substrate according to claim 5, wherein the electrodes are substantially aligned with the surface of the substrate.

7. A substrate in which several electrodes are placed on which varying voltages can be applied individually and said substrate being provided with an ultraphobic coating, wherein the coating is electrically insulating and the contact angle of a water drop resting on the coating is more than 150° and the roll-off angle of a drop of water 10 µl in volume due to gravity is not more than 10° and movement of a drop of water on the coating takes place without residues wherein the ultraphobic coating is a tungsten carbide surface structured by a laser and covered with a hydrophobic and/or oleophobic material.

8. The substrate according to claim 7, wherein the electrodes are substantially aligned with the surface of the substrate.

* * * * *